(12) United States Patent
Gehrke et al.

(10) Patent No.: US 8,878,681 B2
(45) Date of Patent: Nov. 4, 2014

(54) LOCATION BASED PROXIMITY ALERT

(71) Applicant: TeleCommunication Systems, Inc., Annapolis, MD (US)

(72) Inventors: Todd Gehrke, Seattle, WA (US); Chih Wang, Shoreline, WA (US); Farhad Kasad, Bothell, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/014,784

(22) Filed: Aug. 30, 2013

(65) Prior Publication Data

US 2014/0002262 A1    Jan. 2, 2014

Related U.S. Application Data

(63) Continuation of application No. 12/588,330, filed on Oct. 13, 2009, now Pat. No. 8,525,681.

(60) Provisional application No. 61/136,918, filed on Oct. 14, 2008.

(51) Int. Cl.
*G08B 23/00* (2006.01)
*G08B 21/02* (2006.01)
*H04W 4/02* (2009.01)
*H04W 64/00* (2009.01)

(52) U.S. Cl.
CPC ............. *G08B 21/02* (2013.01); *H04W 64/00* (2013.01); *G08B 21/0269* (2013.01); *H04W 4/02* (2013.01); *G08B 21/0286* (2013.01)
USPC ................. 340/573.4; 340/539.13; 455/456.1

(58) Field of Classification Search
CPC .......... H04W 4/02; G08B 21/22; H04L 67/12
USPC ................. 340/573.1, 573.4, 539.11, 539.13, 340/539.23, 686.6; 455/456.1
See application file for complete search history.

(56) References Cited

U.S. PATENT DOCUMENTS

| | | | |
|---|---|---|---|
| 5,727,057 | A  | 3/1998 | Emery |
| 6,049,718 | A  | 4/2000 | Stewart |
| 7,058,358 | B2 | 6/2006 | Cannon |
| 7,269,413 | B2 | 9/2007 | Kraft |
| 7,324,823 | B1 | 1/2008 | Rosen |
| 7,372,839 | B2 | 5/2008 | Relan |
| 7,739,402 | B2 | 6/2010 | Roese |
| 8,190,169 | B2 | 5/2012 | Shim |
| 2004/0046667 | A1 | 3/2004 | Copley |

(Continued)

OTHER PUBLICATIONS

International Search Report received in PCT/US2011/00950 dated Sep. 16, 2011.

(Continued)

*Primary Examiner* — Thomas Mullen
(74) *Attorney, Agent, or Firm* — William H. Bollman

(57) ABSTRACT

A method of location based proximity alert retrieves, from a location based proximity alert physical server, a current location of wireless client devices and determines if it is within a given area. The method accesses, from the location based proximity alert physical server, a physical law enforcement database comprising a restraining order target identifier and a restraining order limit identifier. A geo-proximity alert message is transmitted if the current location of the restraining order target identifier matches the restraining order limit identifier.

13 Claims, 3 Drawing Sheets

(56) References Cited

U.S. PATENT DOCUMENTS

| | | |
|---|---|---|
| 2004/0257273 A1 | 12/2004 | Benco |
| 2006/0058948 A1 | 3/2006 | Blass |
| 2006/0097866 A1* | 5/2006 | Adamczyk et al. ...... 340/539.13 |
| 2007/0030116 A1 | 2/2007 | Feher |
| 2007/0186105 A1 | 8/2007 | Bailey |
| 2007/0271596 A1 | 11/2007 | Boubion |
| 2008/0026723 A1 | 1/2008 | Han |
| 2008/0155094 A1 | 6/2008 | Roese et al. |
| 2008/0198989 A1 | 8/2008 | Contractor |
| 2008/0227467 A1 | 9/2008 | Barnes |
| 2009/0058830 A1 | 3/2009 | Herz |
| 2009/0204815 A1 | 8/2009 | Dennis |
| 2010/0050251 A1 | 2/2010 | Speyer |

OTHER PUBLICATIONS

International Search Report received in PCT/US2011/00671 dated Apr. 25, 2012.

International Search Report received in PCT/US2009/05575 dated Dec. 3, 2009.

International Search Report received in PCT/US2009/05575 dated Jan. 14, 2011.

* cited by examiner

LOCATION BASED PROXIMITY ALERT

The present invention is a continuation of U.S. application Ser. No. 12/588,330, entitled "Location Based Proximity Alert", filed on Oct. 13, 2009, now U.S. Pat. No. 8,525,681; which claims priority from U.S. Provisional Application 61/136,918, filed Oct. 14, 2008, entitled "LOCATION BASED PROXIMITY ALERT", to GEHRKE et al., the entirety of both of which is are expressly incorporated herein by reference.

BACKGROUND OF THE INVENTION

1. Field of the Invention

This invention relates generally to wireless communications. More particularly, it relates to location based services (LBS).

2. Background

Courts routinely order restraining orders for any of a number of reasons. For example, persons can be issued a restraining order ordering them to remain a fix distance from another person, to remain a fix distance from schools, parks, or other establishments related to children. No matter the type of restraining order issued, there persists a problem in enforcing restraining orders.

Generally, restraining orders require persons viewing a restraining order violation to report such a violation to the police. The restraining order violator that is reported to the police is generally arrested for violating the restraining order.

In extreme cases, a tracking device, such as an ankle tracking device, can be court ordered attached to a person to electronically monitor their compliance with a restraining order. However, such electronic monitors are costly and require dedicated monitoring devices to detect a restraining order violation.

There is a need for a method and apparatus that allows for cost effective automated tracking of persons subject to a restraining order. This would eliminate human initiated reporting of a restraining order violation that is limited by a requirement for a human to view a restraining order violator and the ability of the viewer to contact the police.

SUMMARY OF THE INVENTION

In accordance with the principles of the present invention, method of providing location based proximity alert services comprises retrieving, at a location based proximity alert physical server, a current location of a wireless client device associated with a given restraining order target identifier. A law enforcement database comprising a plurality of restraining order target identifiers, each associated with a corresponding restraining order limit identifier, is accessed to obtain a relevant restraining order limit identifier associated with the given restraining order target identifier. A geo-proximity alert message is generated when the current location is within a prohibited geographic area associated with the given restraining order target identifier.

A location based proximity alert physical server in accordance with another aspect of the invention comprises a law enforcement database access module to access a physical law enforcement database comprising a plurality of restraining order target identifiers each associated with a restraining order limit identifier. A location access module retrieves, from the location based proximity alert physical server, a current location of the restraining order target. A restraining order violation module generates a geo-proximity alert message if the current location for the restraining order target enters a prohibited geographic area associated with the restraining order limit identifier.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Figure 1:
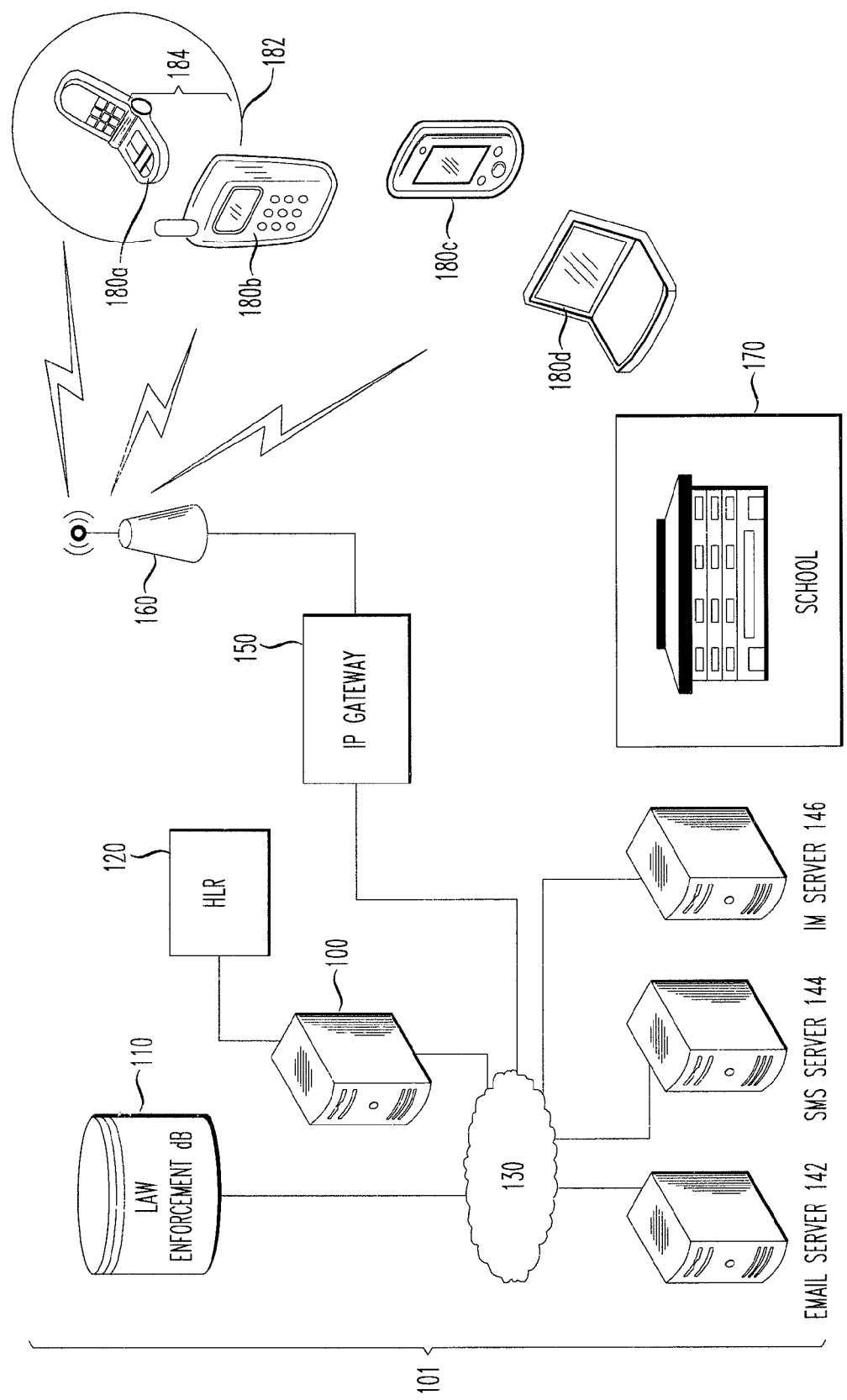
FIG. 1 shows a location based proximity alert system, in accordance with the principles of the present invention.

With respect to law enforcement, a restraining order is a protection device whereby a Court establishes it to be unsafe for two individuals to have contact. Each state in the United States has some form of domestic "stay away" law.

The present invention applies location enabled cell or other wireless equipment to a long-felt but unsolved need in today's society. Namely, in accordance with the principles disclosed herein a proximity alert server monitors for violations of such a restraining order.

In an alternate embodiment, in an everyday case a subscriber might just want to get a notification when another subscriber is in your vicinity. The Subscriber Proximity notification disclosed herein is a system that notifies a subscriber via SMS, or any other messaging system, when another subscriber is using the same or geographically close cell equipment.

The present invention is a service whereby a given subscriber, e.g., subscriber 1, provisions their phone number (or other unique identifying number) of another subscriber (e.g., subscriber 2) and a range, radius or other proximity defining value. Examples of the radius or other proximity defining value might be within 100 yards, within 1 mile, etc. In this example, subscriber 1 receives notification when subscriber 2 gets within a pre-set range, radius or other proximity defining distance of subscriber 1.

The present invention has particular applicability for use when a court ordered restraining order is imposed, and preferably includes a time frame for enforcement of a subject restraining order. For instance, if a given restraining order is valid for 30 days, the geo-proximity alert service in accordance with the present invention preferably automatically expires after 30 days or other appropriate time.

In one given application, each time subscriber 1 registers call-routing information in the appropriate Home Location Register (HLR), the system uses the pre-set proximity defining value to create a proximity-list of cell equipment that is within the perimeter. This system then preferably compares the registered call-routing information for subscriber 2 with the proximity-list. If the subscriber 2 registered call-routing is in the proximity-list, the system then sends an appropriate geo-proximity alert message (e.g., SMS, IM, etc.) to subscriber 1, a law enforcement facility, and/or a public safety access point (PSAP), etc., alerting them to the situation.

This invention has particular relevance and use with a cell phone or personal digital assistant (PDA). In addition to the important law enforcement aspects of the invention, it is also applicable to social networking applications, e.g., if two consenting parties want to know when they are within proximity to one another, or simply in a same general area.

The present invention can also be used to provide information regarding entry of a user's wireless device within an unauthorized proximity to certain types of locations, e.g., schools, playgrounds, and/or other places where children gather, etc. The proximity message may be sent to an appropriate person, e.g., police personnel, along with identifying information sufficient for the police personnel to respond to the situation.

With appropriate sensitivity to privacy issues addressed, the present invention has applicability in non-law enforcement scenarios as well as the law enforcement embodiments disclosed herein.

FIG. 1 shows a location based proximity alert system, in accordance with the principles of the present invention.

In particular, the location based proximity alert (LBPA) system 101 disclosed herein, includes a location based proximity alert (LBPA) server 100, a law enforcement database 110, a home location register (HLR) 120, a communication network 130, various messaging servers 142-146, a gateway 150, and a cellular tower 160. The location based proximity alert (LBPA) system 101 disclosed herein can further include various wireless clients (WCs), such as in particular a cellular telephone 180a, a smart phone 180b, a personal data assistant 180c, and a laptop computer 180d (collectively and individually described herein as wireless client(s) 180).

The location based proximity alert server 100 provides the backbone for location monitoring and message alerting functions disclosed herein. In particular, the location based proximity alert server 100 accesses law enforcement database 110 for parameters with which to base wireless client 180 monitoring, as well as limitations that dictate when a message is to be issued to pre-configured recipients, e.g., in the event of a restraining order violation.

The location based proximity alert server 100 accesses a location service, such as home location register 120. Each time a wireless client 180 registers call-routing information in the home location register 120, the location based proximity alert server 100 can use a pre-set proximity value retrieved from an appropriate law enforcement database 110 to create a proximity-list of wireless clients 180 that are within a pre-defined distance, as defined in the law enforcement database 110. This location based proximity alert system 101 then preferably compares the registered call-routing information for the wireless client 180a within the proximity-list. If the registered wireless client's 180 call-routing is in the proximity-list, the location based proximity alert server 100 then sends an appropriate geo-proximity alert message (e.g., SMS, IM, etc.) to the preconfigured point, e.g., wireless client 180a alerting them that of the situation, e.g., a restraining order violation.

A digital communication network 130 allows the location based proximity alert server 100 to send an appropriate geo-proximity alert message. The digital communication network 130 is preferably an open IP based communication network, such as the Internet. Alternately, the digital communication network 130 is a closed IP based communication network, relying on locally assigned IP addresses. Irrespective of the type of communication network used, the location based proximity alert server 100 communicates with any of a variety of messaging servers, such as e-mail server 142, Short Message Service (SMS) server 144, Instant Message (IM) server 146, etc. through IP packet addressing, as is otherwise known within the art.

An IP gateway 150 provides gateway functions to allow the communication network 130 to send and receive digital data packets to and from a cellular network 160. The cellular network 160 transmits an appropriate geo-proximity alert message from any of e-mail server 142, Short Message Service (SMS) server 144, Instant Message (IM) server 146, etc., to a pre-designated wireless client 180 over the communication network 130.

For example purposes only, the wireless client 180a is shown as having an entry in the law enforcement database 110. However, any number of wireless clients 180 can have simultaneous entries in the restraining order database 110. The wireless client 180a is shown as having an entry in the law enforcement database 110 that corresponds to the radius distance 184.

The radius distance 184 can be a distance measured in any unit of measurement that allows for a determination of a restraining order violation. The radius distance 184 from the wireless client 180a produces a zone of protection 182 around the relevant wireless client 180a.

If the location based proximity alert server 100 determines that a location of the relevant wireless client 180b, as identified in the home location register 130, is within radius distance 184. If the location based proximity alert server 100 identifies the same wireless client 180b as having restricted status in the law enforcement database 110 for that particular wireless client 180a, the location based proximity alert server 100 triggers transmission of an appropriate geo-proximity alert message. As shown in more detail in FIG. 2, the specific type of geo-proximity alert message can be specified as an entry in the law enforcement database 110.

The radius distance 184 is described above as being a protective zone 182 that when breached, e.g., by the wireless client 180b, triggers an appropriate geo-proximity alert message. However, in an alternate embodiment, radius distance 184 can be a restrictive zone that when breached by a geographically stationary point, causes triggering of an appropriate geo-proximity alert message. In this type of embodiment, if the wireless client 180a is the subject of a restraining order that prevents its holder from getting within a configured distance 184 of any school grounds 170, a breach of any of the geographic points associated with school grounds 170 within a given distance 184 results in an appropriate geo-proximity alert message being transmitted to the proper authority(ies). The proper authorities can be preconfigured as an entry in the law enforcement database 110, as show in more detail in FIG. 2.

The law enforcement database 110 preferably is a highly secure database that requires encrypted and password protected access. Law enforcement personnel are preferably provided remote access to the law enforcement database 110 through a secure digital connection. A web page can be used to populate the entries within the law enforcement database 110, as well as to review and correct entries within the law enforcement database 110.

Although the location based proximity alert server 101 relies on access to a home location register (HLR) to monitor the location of wireless clients 180, any of a number of location services can be employed to determine the location of a given wireless client 180. For instance, the Global Positioning System (GPS) is becoming commonly integrated within wireless clients 180, and if available can be used to directly provide location information for the relevant wireless client 180 to the location based proximity alert server 100. Alternately, within the principles disclosed herein, cellular triangulation, signal strength monitoring, etc. may alternatively be used to provide location information for a wireless client 180 to the location based proximity alert server 100.

Figure 2:
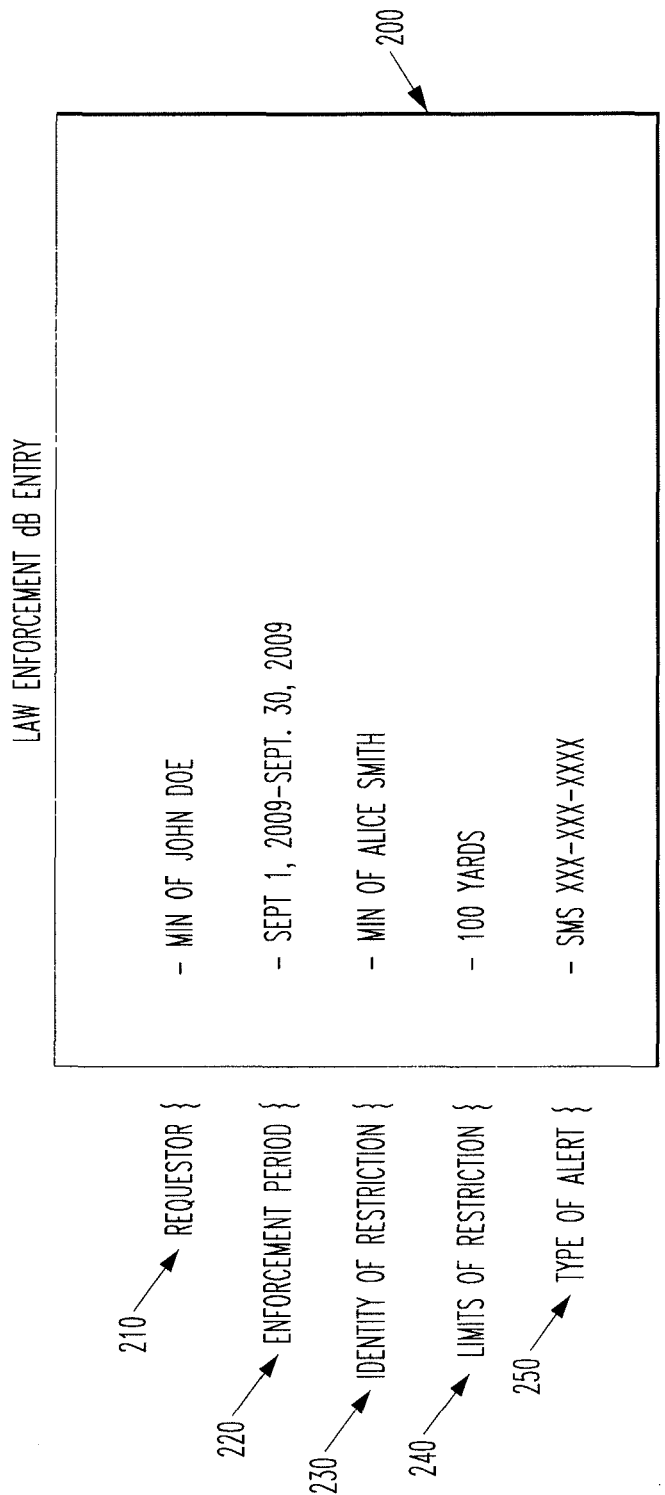
FIG. 2 shows an example entry in the law enforcement database shown in FIG. 1, in accordance with the principles of the present invention.

FIG. 2 shows an example entry 200 in the law enforcement database 110 shown in FIG. 1, in accordance with the principles of the present invention.

In particular, entry 200 can include a requestor field 210, an enforcement period field 220, an identity of restriction field 230, a limits of restriction field 240, and a type of alert field 250.

The example requestor field 210 is shown as being "MIN of John Doe". However, the requestor field 210 could include a state, a county, a country, etc. that issued a restraining order.

The example enforcement period field 220 is shown as being "Sep. 1, 2009-Sep. 30, 2009". However, the enforcement period field 220 could include specific times of a day, specific days of the week, specific months of the year, and even years of enforcement, all in accordance within the principles disclosed herein.

The example identity of the restriction field 230 is shown as being "MIN of Alice Smith". However, in accordance with the principles disclosed herein, the identity of the restriction field 230 could include telephone numbers, specific longitude(s) and latitude(s), ranges of longitudes and latitudes, names of geographic places that can be cross-referenced to their geographic locations, etc.

The limits of restriction field 240 is shown in the exemplary embodiments as being "100 yards". However, in accordance with the principles disclosed herein, the limits of the restriction field 240 could be a zero value requiring direct contact with the identity of the value associated with the identity of the restriction field 230, a measurement in miles, a city limits value, a state value, etc.

The type of alert field 250 is shown in the exemplary embodiments as being "SMS XXX-XXX-XXXX". However, in accordance with the principles disclosed herein, the type of alert field 250 can designate e-mail and an e-mail address, can designate IM and an IM address, can designate the police, can designate a relative of the restraining order requestor, can designate any desired telephone number to call, etc. Preferably, if the location based proximity alert server 100 dials a telephone number to provide a location based proximity alert relating to a violation of a restraining order. A pre-recorded message may be played, and a further option may be provided to connect with a public access safety point (PSAP), police station, etc., to avoid delay in responding to the restraining order violation. Likewise, if the location based proximity alert server 100 transmits a text message to provide a location based proximity alert relating to violation of a restraining order, information useful to police or other authorities is preferably provided with the text message.

Alternately, within the scope of the principles disclosed herein, the type of alert field 250 could designate a list of services to contact in the event that a given restraining order is being violated, with contact to authorities such as police, a private security company, etc. The location based proximity alert server 100 can use the designated list of services to trigger transmission of a plurality of geo-proximity alert messages in response to a single restraining order violation. The type of alert field 250 can even include a mobile identification number (MIN) to assist in reaching a wireless client 180 in the event an alternate designated method fails to reach the wireless client 180.

Figure 3:
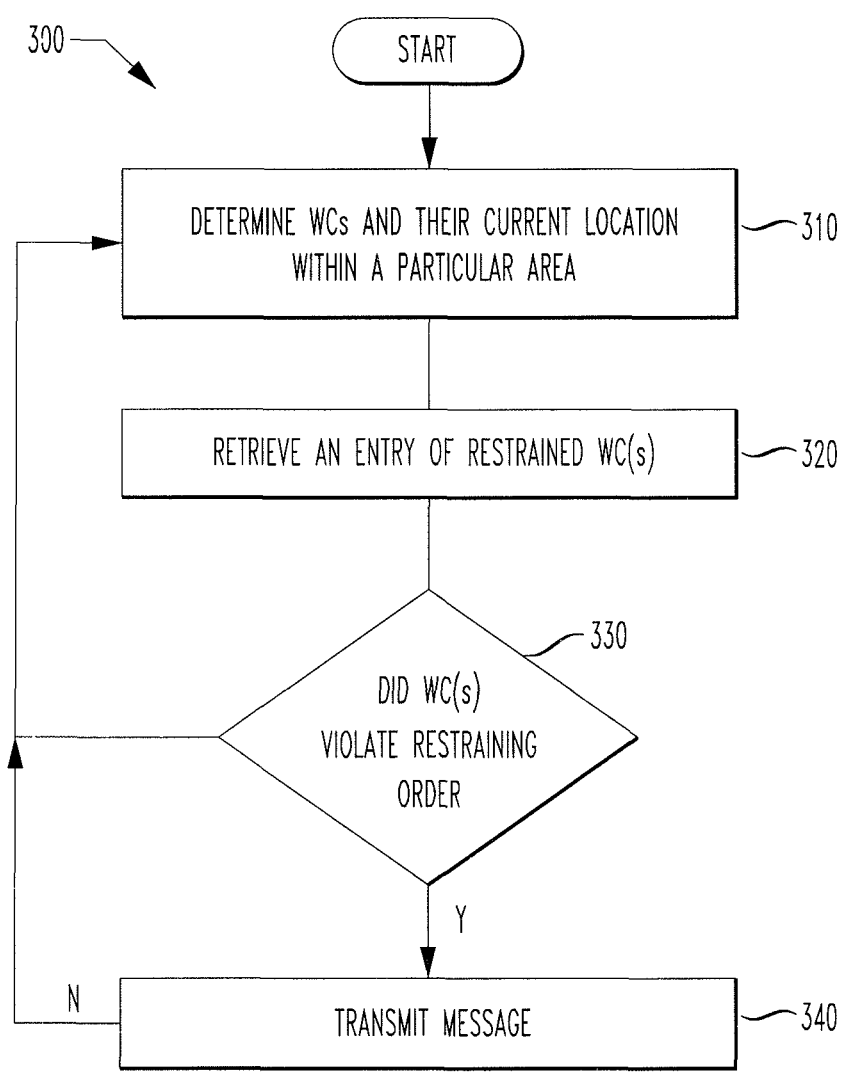
FIG. 3 shows an exemplary flow chart for a process of triggering a geo-proximity alert message, in accordance with the principles of the present invention.

FIG. 3 shows an exemplary flow chart for a process of triggering a geo-proximity alert message 300, in accordance with the principles of the present invention.

In particular, as shown in step 310 of FIG. 3, a determination is made of which wireless client(s) 180 exist within in a particular area. The location based proximity alert server 100 can access a home location register 120 to retrieve a list of wireless clients 180 and their respective locations that have registered call-routing information in the home location register 120.

In step 320, a determination is made if any of the wireless clients 180 that were determined to be within a particular area in step 310 are subject to a restraining order. The location based proximity alert server 100 can use the list of wireless clients 180, e.g., MINs, that were determined to be within a particular area in step 310 as a database query issued to law enforcement database 110. Any matched wireless clients 180 returned from the database query provides a list of wireless clients 180 that are subject to a restraining order and their respective restrictions.

In step 330, a decision is made if the wireless client 180 that is subject to a restraining order is in violation of its respective restrictions. The location based proximity alert server 100 compares the geographic location of the wireless client 180 (e.g., wireless phone) that is subject to a restraining order, to the geographic location of the identity of the restriction, as retrieved from law enforcement database 110. The identity of the restriction can be, e.g., proximity to another wireless client WC 180 (such as a wireless phone carried by an ex-girlfriend), or within geographic boundary coordinates corresponding to a restricted perimeter around an area where children would be, e.g., a school, a playground, a daycare center, etc.

If the result of the decision from step 330 is that a restraining order violation has occurred, step 330 branches to step 340. Otherwise, step 330 branches back to step 310 to continuously monitor for a restraining order violation.

In step 340, an appropriate geo-proximity alert message is generated and transmitted (e.g., via SMS, IM, etc.) to whatever alert destination that is pre-configured by specification in the type of alert field 250 in the restraining database entry 200. The location based proximity alert server 100 initiates transmission of an appropriate geo-proximity alert message to the pre-configured alert destination that is associated with the wireless client 180 that was determined to have violated its restraining order in step 330.

Step 340 branches back to the beginning of the process of triggering a geo-proximity alert message 300 to allow for continuous monitoring of restraining order violations, in accordance with the principles disclosed herein.

Although the embodiments described herein provide for a location based proximity alert based on movement of a wireless client (e.g., a wireless phone) carried by an offender subject to a restraining order, the principles disclosed herein can be applied to alert a subscriber of a wireless client 180 of proximity to another wireless client 180 and/or proximity to a specific geographic location. The identity of other wireless clients 180 and/or specific geographic locations can be stored in a database entry, e.g., in an entry in the law enforcement database shown in FIG. 2. In this manner, law enforcement or even another subscriber can be alerted when they become within a preconfigured radius distance 184 to a select wireless client carried by, e.g., a friend or family member.

While the invention has been described with reference to the exemplary embodiments thereof, those skilled in the art will be able to make various modifications to the described embodiments of the invention without departing from the true spirit and scope of the invention.

What is claimed is:

1. A method of providing location-based proximity alert services, comprising:

retrieving, by a location-based proximity alert physical server, a current location of a given wireless device, said current location being based on call-routing information which is retrieved from a location device servicing said given wireless device;

retrieving, from a prohibited area database comprising a plurality of target identifiers, each target identifier being associated with a respective wireless device, a given target identifier being associated with said given wireless device; and generating a geo-proximity alert message when a current location of said given wireless device is within a prohibited geographic area associated with said given target identifier.

2. The method of providing location-based proximity alert services according to claim 1, wherein:

said given target identifier is a mobile identification number (MIN).

3. The method of providing location-based proximity alert services according to claim 1, wherein:

said given target identifier is a mobile telephone number.

4. The method of providing location-based proximity alert services according to claim 1, further comprising:

determining a distance between said wireless device associated with said given target identifier, and a requesting wireless device requesting said geo-proximity alert message.

5. The method of providing location-based proximity alert services according to claim 1, wherein:

said prohibited geographic area associated with said given target identifier is defined by a perimeter around a given school.

6. The method of providing location-based proximity alert services according to claim 1, wherein:

said prohibited geographic area associated with said given target identifier is defined by a perimeter around a given park.

7. The method of providing location-based proximity alert services according to claim 1, wherein:

said geo-proximity alert message is an email message.

8. A location-based proximity alert physical server, comprising:

a location-based proximity alert physical server retriever to retrieve a current location of a given wireless device, said current location being based on call-routing information which is retrieved from a location device servicing said given wireless device, and to retrieve a particular target identifier associated with said given wireless device from a prohibited area database comprising a plurality of target identifiers; and a violation module to generate a geo-proximity alert message when a current location of said given wireless device is within a prohibited geographic area associated with said particular target identifier.

9. The location-based proximity alert physical server according to claim 8, wherein:

said particular target identifier is a mobile identification number (MIN).

10. The location-based proximity alert physical server according to claim 8, wherein:

said violation module generates said geo-proximity alert message when said given wireless device associated with said particular target identifier is less than a pre-configured minimum distance from another wireless device requesting said geo-proximity alert message.

11. The location-based proximity alert physical server according to claim 8, wherein:

said prohibited geographic area associated with said particular target identifier is defined by a perimeter around a given school.

12. The location-based proximity alert physical server according to claim 8, wherein:

said prohibited geographic area associated with said particular target identifier is defined by a perimeter around a given park.

13. The location-based proximity alert physical server according to claim 8, wherein:

said geo-proximity alert message is an email message.

* * * * *